Figure 1:
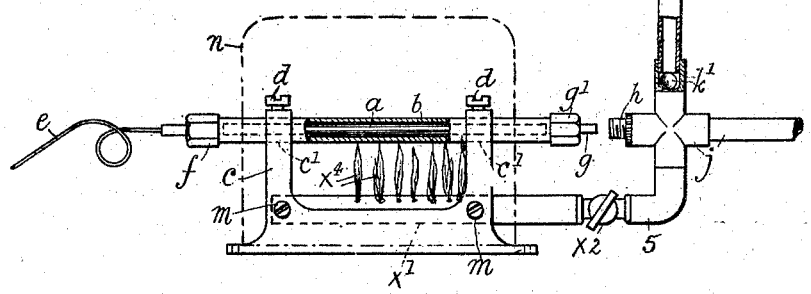

P. C. PACE.
APPARATUS FOR GENERATING COMBUSTIBLE VAPOR.
APPLICATION FILED APR. 14, 1910.

967,044.

Patented Aug. 9, 1910.

2 SHEETS—SHEET 1.

Witnesses:
H. J. P. Gee
V. W. Ward.

Inventor:
P. Currall Pace.
By Spear, Middleton, Donaldson & Spear
Attorneys.

THE NORRIS PETERS CO., WASHINGTON, D. C.

P. C. PACE.
APPARATUS FOR GENERATING COMBUSTIBLE VAPOR.
APPLICATION FILED APR. 14, 1910.
967,044.
Patented Aug. 9, 1910.
2 SHEETS—SHEET 2.
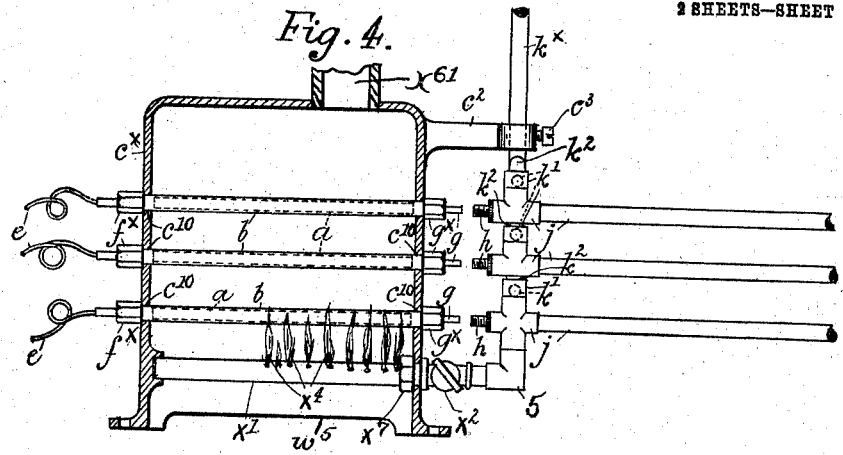
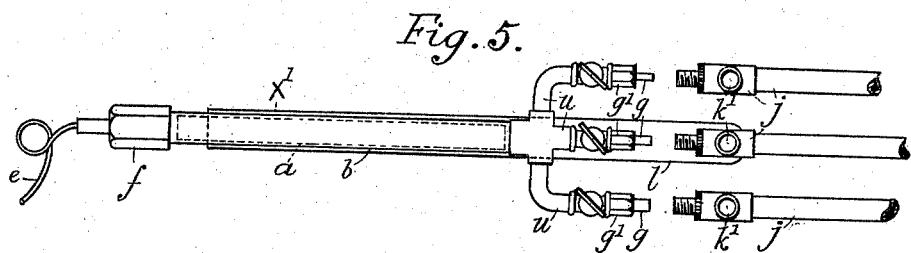
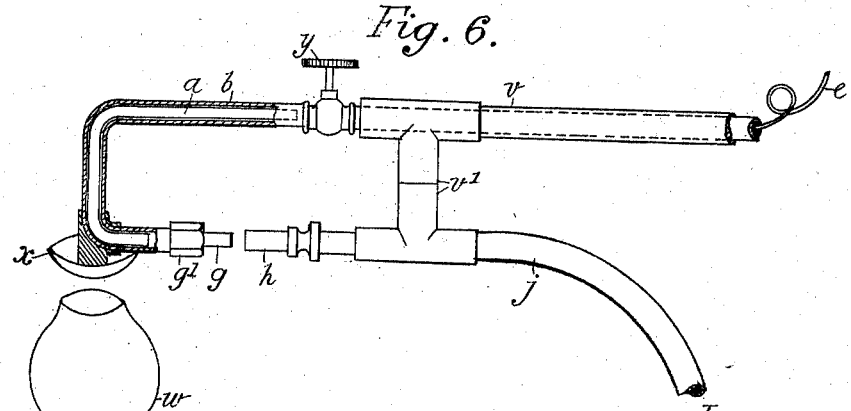

ome

UNITED STATES PATENT OFFICE.

PERCY CURRALL PACE, OF LOXWOOD, BILLINGHURST, ENGLAND.

APPARATUS FOR GENERATING COMBUSTIBLE VAPOR.

967,044.  Specification of Letters Patent.  Patented Aug. 9, 1910.

Application filed April 14, 1910. Serial No. 555,374.

*To all whom it may concern:*

Be it known that I, PERCY CURRALL PACE, a subject of Edward VII, King of Great Britain and Ireland, and residing at Loxwood, Billinghurst, in the county of Sussex, England, have invented certain new and useful Improvements in and Relating to Apparatus for Generating Combustible Vapor, of which the following is a specification.

In apparatus for generating combustible vapor, gauzes have heretofore been employed for collecting foreign particles from the vapor. These gauzes become clogged and require to be cleaned, thereby necessitating a certain amount of dismantling, reassembling, and readjustment of the apparatus and consequent expenditure of time and trouble.

An object of this invention is to overcome this objection, and this I do by providing the generating tube with a solid core, preferably of metal, which will not corrode or shed particles and which is so fitted therein that, at the highest temperature which it reaches in use, the space between it and its containing tube is only just sufficient for the passage of the liquid and vapor along it. Thus, the liquid around the core in the generator, being in the form of a thin film, is immediately vaporized and the vapor passes from said space in the form of a steady stream. Moreover, as the said space is so small there is very little risk of solid particles passing along it and reaching the vapor passages. I prefer to make the core as thick as possible, consistent with its being able to quickly absorb heat, so that it shall have a large surface in order to reduce the risk of any appreciable blocking of the said space by solid particles. Further, in previously constructed apparatus of the type in question, it has not, so far as I am aware, been possible to supply vapor to a number of lights placed at a considerable distance from the generator so that they shall burn as smoothly and quietly as ordinary coal-gas lights. According to the present invention, however, I do this by allowing the generator, carrying a core as above described, to extend beyond the direct vaporizing heat, and also by passing the vapor into a supply pipe which is provided with a vent.

Arranging the generator so that it projects in the manner just described is probably not essential but it has the advantage of insuring a gradual heating of the petrol or the like, and I find that this arrangement of the generator combined with the vent, produces a smooth and quiet flow of gas in the supply pipe. Moreover, I am enabled to use a comparatively large outlet orifice for the vapor at the vapor-end of the generator, and I find that this enables me to obtain the correct mixture of vapor and air, and that the mixture can be conducted through long distances without condensation, and without any deterioration in quality.

The preferred method of carrying out this invention is illustrated in the accompanying drawings, wherein—

Figure 2:
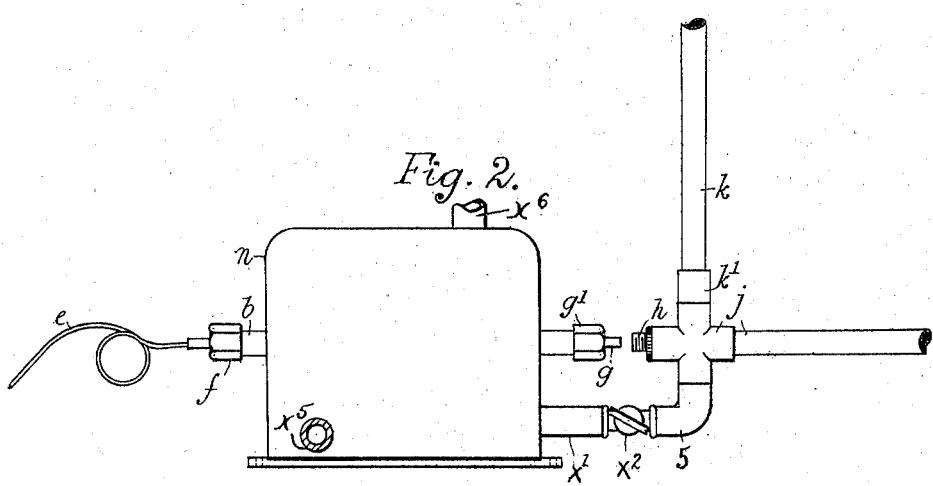
Figure 3:
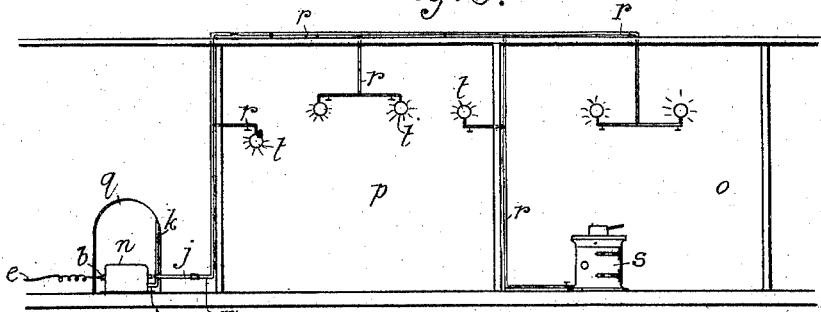

Figure 1 is an elevation, partly in section, of my improved apparatus, and Fig. 2 is an elevation showing said apparatus covered by a heat-retaining cover. Fig. 3 shows diagrammatically the application of this invention to lighting and cooking apparatus. Fig. 4 is an elevation, partly in section, of an arrangement of generators arranged one above the other according to this invention. Fig. 5 is a plan, partly in section, and shows a single generator combined with a plurality of vapor outlet nipples in accordance with this invention, and Fig. 6 is an elevation, partly in section, of a modification of my improved generator.

Like letters refer to like parts throughout the several views.

In the drawings, *a* is the core, which is composed of material which will not corrode or shed particles, preferably brass or copper, and it is fitted slidingly within a tube *b*. The space between the core and the tube is shown exaggerated in the drawings for the sake of clearly showing it. The parts *a* and *b* comprise the generator.

*c* is a support which supports the generator (Figs. 1, 2 and 3). At either end of the support *c* holes *c'*, *c'* are provided into which the generator is introduced, and in Fig. 1 the generator is held in position by means of screws *d*, *d*.

*e* is the petrol or the like supply-pipe which is secured to the generator by means of a nut *f*.

*g* is the vapor-exit nipple secured to the generator by means of a nut *g'*. The vapor passes from the nipple *g* into the nipple *h* which is adjustably arranged in the vapor-supply pipe *j*. This pipe *j* is furnished with a vent-pipe *k* in which is placed a check valve $k'$. Leading from the pipe $j$ is a bypass $5$ which conducts a portion of the vapor to a pipe $x'$; the supply of vapor thereto being regulated by a tap $x^2$.

In Fig. 1, the pipe $x'$ is held in place in the stand $c$ by means of screws $m, m$. The vaporizing heat is obtained from jets $x^4$ issuing from perforations in the pipe $x'$. A portion only of the generator is in the direct heat-zone of these jets, the remaining portion thereof being intended to carry the heat along and thereby effect a gradual vaporization of the petrol or the like, resulting in an even ejection of vapor from the nipple $g$. Variation of pressure in the vapor-supply pipe $j$ causes the check valve $k'$ to rise or fall, resulting in an even and quiet flow of vapor in said pipe and also at the burners. Each supply-pipe may supply a separate set of burners.

$n$, Figs. 1, 2 and 3, is the heat-retaining cover, which is removable and is provided with inlet and exhaust openings $x^5$ and $x^6$. This cover is simply placed over the stand $c$, where the latter is in the form shown in Fig. 1, but the stand $c^x$ shown in Fig. 4 itself constitutes also the cover. As shown in this figure the stand is provided with a number of generators $a$—$b$ which pass through holes $c^{10}$ in the stand and are held in place by nuts $f^x$ and $g^x$. The burner in this figure is held in place by the tap $x^2$ and a back nut $x^7$. In this figure each generator is connected with the vent pipe $k^x$ by means of a connection $k^2$ in which connection the check valve is located. The vent pipe is supported by an arm $c^2$ and a screw $c^3$ passing through the outer end of said arm. The cover $c^x$ is provided with an air inlet $w^5$ and an exhaust $x^{61}$.

An example of how the apparatus may be used in connection with ordinary lighting and cooking apparatus is shown in Fig. 3, in which $o, p$ represent two rooms of a dwelling house. The generating apparatus may be placed in a fire-place $q$, or it may even be placed outside the house, so as to reduce the risk of fire. The vapor is conducted by means of pipes $r$ to an ordinary coal-gas cooking-stove $s$ in the room $o$, and to ordinary coal-gas lighting-burners $t$ in the room $p$.

Referring to Fig. 5, $u, u$ are branches connected with a single generator, and the vapor-outlet nipples $g, g$ of these branches may be of different sizes so as to deliver different quantities of vapor into the supply-pipes $j, j$ (each of which may be connected to a separate set of burners) depending upon the number of burners it is desired to supply from each pipe.

In the modified form of generator shown in Fig. 6, the core $a$ is first placed within the tube $b$, and the two are then bent together. This form of apparatus is useful when it is desired to combine the generator with a gas-fitting such as a wall-bracket or chandelier. In the figure the generator is supported by a pipe $v$ which forms part of a wall-bracket and carries a double T-joint $v'$, the lower portion of which supports the vapor-supply pipe, part of which is shown at $j$. This pipe is intended to carry an ordinary burner, the globe of which is indicated at $w$. A receptacle $x$ is arranged beneath the generator and is adapted to contain spirit for the usual preliminary heating of the generator, the heat of which is subsequently maintained by heat from the burner. The supply of petrol or the like to the generator is controlled by a tap $y$.

I claim:—

An apparatus for generating combustible vapors comprising a stand, a tube supported therein, a non-corrosive core in the tube leaving a film-space between itself and the tube, a supply pipe connected with one end of said space, an exit nipple connected with the other end, a vapor supply pipe, an adjustable nozzle therein located opposite the exit nipple and spaced therefrom for receiving the vapor from said nipple, a vent pipe connected with said vapor supply pipe, a check valve therein for compensating the variations of pressure of the fluid, a burner in said stand below the tube and a by-pass pipe leading from said vapor supply pipe to the burner, said tube and core extending beyond the direct heat zone of the burner.

In witness whereof I have hereunto set my hand in the presence of two witnesses.

PERCY CURRALL PACE.

Witnesses:
HELEN C. HUNTER,
FREDK. D. O'GORMAN.